3,316,965
MATERIAL AND PROCESS FOR TREATING
SUBTERRANEAN FORMATIONS
David J. Watanabe, Orange, Calif., assignor to Union Oil
Company of California, Los Angeles, Calif., a corporation of California
No Drawing. Filed Aug. 5, 1963, Ser. No. 300,060
45 Claims. (Cl. 166—33)

This invention relates to the treating of subterranean formations, and in particular it is concerned with hydrocarbon-polymer particles used as novel temporary sealing or plugging agents, propping agents, viscosity increasers, and selective permanent plugging agents. Further, this invention concerns a novel method of making spheroidal hydrocarbon-polymer particles, and also relates to particular novel hydrocarbon-polymer compositions for use as well treating fluid additives.

The production of fractures in subterranean formations by the application of hydraulic pressures in conventional in the art. The fracturing fluid often incorporates temporary plugging or sealing materials, as well as permanent propping agents, to plug the fractures or other high permeability zones opened by the fracturing. The temporary sealants are used in attempting to produce a series of consecutive fractures from the same well when a fracturing fluid is injected into the formation around the well under repeated high hydraulic pressure stressing.

In many regions of the United States, hydraulic fracturing treatment of oil-bearing formations has greatly benefited the oil industry, bringing about important increases in oil production. The fundamental process of hydraulic fracturing treatment consists essentially of injecting a viscous fluid containing a propping agent, such as sand, at high flow rate and under high hydraulic pressure to bring about fracturing of a formation. The producing flow capacity of a formation can be spectacularly increased by hydraulic fracturing, bringing about as great as a 30,000 fold or larger extension of the available oil producing area in the fracture which extends into the formation being held open by the propping agent. Thus, the increase in oil production is related to the increase in the effective bottom-hole producing area of the well resulting from the creation of a fracture of great areal extent. In actual practice, the effectiveness of prior art fracturing operations is affected importantly by the intrinsic characteristics of the formation being treated. The formation must not only be susceptible to fracturing, but also the formation must possess sufficient hardness to prevent resealing of the propped fracture under the load of high overburden pressures.

In the past, hydraulic fracturing in many areas such as California has been tried on a more or less random basis and has met with indifferent success. The poor results of fracturing in California is usually attributed to the presence of predominantly soft, incompetent formations. There has been a long felt need in the industry for a method of fracturing these formations with hydraulic fracturing treatment. However, none of the prior art fracturing fluid additives have been effective in providing a temporary supporting effect on incompetent formations while providing temporary sealing for fracturing. Furthermore, in California and similar areas, many oil reservoirs are located in hard formations that are susceptible to conventional fracturing and are capable of being supported by the propping agents usually used for the treatment. Because of the thick sections frequently involved in both types of structure, and often the close association between water saturated fractures and oil saturated fractures, the fracturing procedures preferably include the use of temporary sealing agents for producing multiple fractures in both the hard and soft formations, and also often include a selective plugging agent for shutting off production from fractures connected with water zones while giving maximum economic oil flow capacity in the fractures connected with oil zones. However, prior art fracturing fluid additives have not been able to satisfy any of these needs to an extent necessary to bring about common use of this oil recovery tool.

A commonly used prior art temporary plugging material is naphthalene, but naphthalene has many disadvantages as either a temporary propping agent or as a temporary or permanent sealing agent. Naphthalene, being crystalline, is not sufficiently deformable in forming a plugging structure against openings in a formation to stop fluid flow, and, in fact, naphthalene shatters or cleaves when stressed. Furthermore, the very high solubility of naphthalene in formation hydrocarbons requires the injection of excessively large particles which dissolve appreciably during introduction to the well and placement in the formation. Eventually, these large naphthalene particles dissolve to smaller sizes which hopefully fit into the fracture opening. However, a substantial portion of the naphthalene is thus wasted resulting in a great loss in effectiveness as a temporary plugging agent and resulting in tremendously increased costs for the operation because of dissolution. A still further disadvantage in the use of naphthalene as a temporary propping or plugging agent lies in the random particulate shape and oversize particles required which make injection into the formation difficult, if not impossible, through a typical slotted well liner or perforated completion liner of a well. The naphthalene particles bridge within the well bore and few if any particles enter through the slots into the formation. When the naphthalene has dissolved sufficiently to pass through the slots, the particle size is so small that the desired plugging and propping properties have essentially disappeared.

Another common problem in working with subterranean formations when drilling, completing, or in other way working with fluids in a formation adjacent a well bore is that the treating fluids are lost. In drilling this is commonly known as "lost circulation" since the drilling fluid does not return to the surface, i.e., where the well bore enters the earth, but instead is disseminated into the formation. Thus, a major problem is that any fluid placed in a well bore for some special purpose does not remain there as intended but flows into the formation adjacent the hole and is lost. In order to prevent this there are a number of conventional techniques used such as cementing and the like. Also, it is common to add fibrous and granulated materials to the well fluids and then injecting them into a location in a well where they can be available to seal off fissures, cracks, or caverns in a formation. Typical lost circulation additives are shredded or granular particles of asbestos, mica, plastics, cotton fibers, cellophane flakes, chopped rope, and many others. However, a serious disadvantage is found in these materials when used in the sealing or plugging of oil bearing formations in that the plug is permanent rather than temporary and the sealing materials thus either prevent subsequent oil production and gas production from being resumed or at least reduce production substantially. Physical techniques are often used to remove the cementing and lost circulation additives from the formation wall and the surrounding structure, but such mechanical removal is usually unsuccessful. The myriad of prior art materials for use as sealing and plugging agents all have at least one or more of the following disadvantages: (1) extremely low or no solubility in hydrocarbon formation fluids, i.e., hydrocarbon oils or gases; (2) excessive solubility in the hydrocarbon formation fluids; (3) extremely high cost; (4) random particulate structure having poor packing or sealing characteristics and being difficult to inject into the formation by pumping because of bridging in the well bore; (5) non-reversibility in sealing or plugging characteristics, i.e., difficult to remove plug; and (6) non-selective in plugging characteristics.

It is accordingly an object of this invention to provide an improved method of sealing or plugging the walls of a well bore or formation fractures, fissures, or caverns.

Another object is to provide an improved method of selectively plugging well sections or formations producing both hydrocarbon and water materials so as to restrict or permanently stop the flow of subterranean water into the well bore.

A still further object of this invention is to provide an improved hydrocarbon-polymer viscosity increasing agent which has the initial injection characteristic of particulate solids thus being non-viscous during injection into the well and the formation, but which subsequently dissolves in the formation oil or secondary recovery fluid thus increasing the viscosity of the solvent recovery fluid at the interface location in the formation between the injection fluid and the formation hydrocarbon existing therein.

A still further object of this invention is to provide a homogeneous hydrocarbon-polymer material which is particularly useful as a plugging agent in fracturing of soft or incompetent formations.

Another object of this invention is to provide an effective particulate plugging or sealing material having a shape and/or physical characteristics which permit the sealing material particles to pass easily without damage through slotted liners, contrasting with prior art particulate plugging agents which cannot be used successfully with slotted linears.

A further object of this invention is to provide an improved process for the fracturing of oil bearing formations, and particularly for multiple stage fracturing of such formations.

A further object of this invention is to provide a temporary sealing agent which retains sufficient strength and sealing properties for a period sufficient to allow complete cleaning of a well bore, including the necessary sand bailing which accompanies fracturing operations, without the usual interfering sand and fluid flow from the formation, yet which sealing agent shortly after bailing has dissolved permitting full oil flow from the well.

A still further object of this invention is to provide an improved temporary propping agent which, when used in combination with other permanent propping agents in fracturing operations, can be dissolved away leaving a maximum permeability in the propped fracture or fissure for formation oil flow.

A still further object of this invention is to provide a temporary propping agent which minimizes the falling of sands in vertical fractures while under pressure, thus providing a satisfactorily propped vertical fracture opening for oil production; and to further provide a temporary propping agent which, when used with excessively high overburden pressure, prevents the sand or other permanent propping agents either from being crushed or from being displaced by holding the sand closely together and in place, thus not losing the effectiveness of the permanent propping agent by crushing and shifting.

Other and related objects will be apparent from the detailed description of the invention, and various advantages not specifically referred to herein will be apparent to those skilled in the art on employment of the invention in practice.

I have now found that the foregoing objects and their attendant advantages can be realized by treating underground formations with an improved, preferably specially manufactured, particulate solid material made from homogenous mixtures or blends of hydrocarbons and polymers. The hydrocarbon-polymer blends of this invention have variable softening points and melting points depending upon the particular hydrocarbon and polymer components of the composition and the proportion of each present. Generally, the hydrocarbon materials of this invention are solids which are substantially insoluble at ambient temperatures in the hydrocarbon formation fluids or carrier fluids used to deliver these materials to the underground location where they serve as plugs, seals, viscosity increasers, props, and the like. Thus, the particular blend to be used in each case can be selected depending on its melting point, softening point, solubility in the formation fluid, solubility in the carrier fluids, the ambient temperature, and the down-hole or formation temperature. The hydrocarbon-polymer particles used herein are thus relatively insoluble in the cool carrier liquid, but after injection into a well bore or formation, the carrier liquid, and thus the hydrocarbon-polymer particles slurried therein, gradually rise in temperature to the formation temperature. When the hydrocarbon-polymer particles reach the formation temperature, the solids either dissolve immediately or within a predetermined time. This time of solution at the formation temperature can, of course, be adjusted by varying the proportions and species of hydrocarbons and polymers used in the blend composition. Characteristically, the particles used in the well treating and formation treating processes of this invention are somewhat deformable and sometimes soft and/or pliable, yet ordinarily with sufficient structural strength so that they do not shear, tear, or disintegrate readily in use for temporary periods such as from several minutes to several hours depending on the use. Thus, these hydrocarbon-polymer particles can be of a composition which essentially completely seal an opening in the well bore or the formation, resulting in substantial stoppage of fluid flow through such openings. This flow stoppage can be either temporary or permanent depending upon the composition of the fluids present in the formation, and to a lesser degree depending upon the formation temperature.

The particular hydrocarbon material to be used in the manufacture of the hydrocarbon-polymer blend used in this invention is usually a hydrocarbon which is non-gaseous at room temperatures and can comprise light hydrocarbons, oils, waxes, and greases as well as polycyclic hydrocarbons such as naphthalene, anthracene, phenanthrene, asphalt, and other hydrocarbon materials having oil solubility at formation temperatures. Preferred hydrocarbon components for use in making the particles for the processes of this invention comprise waxes such as the crystalline and micro crystalline petroleum waxes, as well as beeswax, carnauba wax, candelilla wax, montan wax, and the like. Also useful are the fats and hardened oils, for example, highly hydrogenated oils including both animal and vegetable oils which are somewhat similar to the thickened mineral oils such as cup grease or the like which are also satisfactory. A particularly preferred material in many of the uses of this invention are the paraffinic petroleum waxes comprising primarily straight chain hydrocarbons containing eighteen or more carbon atoms. All of the waxes useful in this invention can also contain minor amounts of conventional wax modifiers such as dyes, pigments, fillers, and the like. The waxes, i.e., hydrocarbons which are solids at room temperature such as those paraffinic materials containing eighteen or more carbon atoms, can be used alone or with other waxes or in combination with liquid hydrocarbons or mixtures of liquid hydrocarbons, or with other hydrocarbon components such as those disclosed herein above.

I have further discovered that the light aliphatic hydrocarbon materials which are liquid at room temperature and contain from four to seventeen carbon atoms such as butane, pentane, pentene, hexane, hexene, decane, heptadecane, and the like are particularly preferred, either alone or with other hydrocarbons, as the hydrocarbon component in the manufacture of certain soft hydrocarbon-polymer materials used in the processes disclosed herein. These liquid hydrocarbon components of a hydrocarbon-polymer blend can include commercial materials such as liquid petroleum gas, gasoline, kerosene, stove oil, diesel oil, and the like. Also, these light liquid hydrocarbon materials can be used in admixture with the other hydrocarbon materials disclosed above as well as with each other or singly in making the blend treating materials of this invention.

The organic polymeric material that can be used in the homogenous mixtures utlized in manufacutring the hydrocarbon-polymer particulate solid materials of this invention comprise both condensation polymers, such as amides (nylon) and phenolic resins, and addition polymers such as polyethylene and the like. The available polymeric materials, which are most useful for my hydrocarbon-polymer blends, have a softening point starting at the melting point, e.g., 130° F.–150° F. of an average hydrocarbon wax component. However, most of the polymers used in my hydrocarbon-polymer blends have much higher softening points. The addition polymers are preferred, and particularly preferred are those materials which have a straight chain characteristic in their molecular structure, e.g., synthetic resins such as polyethylene, polypropylene, polybutylene, polyisoprene, polyisobutene, copolymers of ethylene and vinyl acetate, copolymers of ethylene and ethylacrylate, copolymers of ethylene and methylacrylate, polyvinyl chloride, and the like. One of the reasons for the particular preference of addition polymers is that they have the characteristic of blending most readily with the highly preferred paraffinic hydrocarbons to provide the properties desired in the hydrocarbon-polymer particles used in treating subterranean formations. It has been observed that compatibility of the hydrocarbon and polymer types is sometimes related to their similarity in structure. Thus, it is preferred to use addition polymers with straight chain hydrocarbons, e.g., kerosene and a copolymer of ethylene and ethylacrylate, and to use polycyclic polymers with polycyclic hydrocarbons, e.g., polybenzene and naphthalene or asphaltenes, with the understanding that third components having a lack of compatibility with one of the original blend components but compatibility with the other can often be incorporated into the homogenous hydrocarbon-polymer blend to provide a particular use characteristic.

Typical preferred polymers include the "Elvax" vinyl resins manufactured by E. I. du Pont de Nemours and Company which are high molecular weight ethylene/vinyl acetate copolymers, e.g., Elvax 150 has a comonomer ratio wt. percent ethylene:vinyl acetate of about 67:33; and Elvax 220, Elvax 240, Elvax 250, and Elvax 260 have a comonomer ratio, wt. percent ethylene:vinyl acetate of about 72:28. Also readily available commercially are the ethylene/ethyl acrylate copolymers manufactured by the Dow Chemical Company called Experimental Resins X–3488.2 and X–3488.3, as well as Union Carbide DYLT which is a conventional polyethylene having a molecular weight of about 12,000.

It has been found that a very large proportion of polymer is difficult to blend with a small proportion of hydrocarbon. One explanation for this is that the Van der Waals forces between the polymer molecules are very great at high polymer concentrations and decline rapidly as the hydrocarbon proportion is increased. This accounts to some degree for the very poor solubility characteristics of polymeric materials in hydrocarbon formation fluids. A particular characteristic of addition polymer materials is that solvent solutions of the polymer are less viscous at intermediate concentration in a given solvent than at lower concentrations of the polymer in the same solvent. Thus, excessively high polymer concentrations in the hydrocarbon-polymer blend is not only very expensive, but can be detrimental in uses where high viscosity of a resulting blend solution with fluids in the formation is desired.

Any of the addition polymers or condensation polymers can be used either alone or in admixture with any other compatible organic polymer to comprise the polymeric component of my homogeneous hydrocarbon-polymer blend. Likewise, any hydrocarbon as previously set forth can be used either alone, or in admixture with any other compatible hydrocarbon to comprise the hydrocarbon component of my homogeneous hydrocarbon-polymer blend. The weight ratio of the hydrocarbon component to the organic polymer component in the hydrocarbon-polymer blends of this invention usually varies from about 199 to 1 to about 1 to 6. However, I have found that the addition of any substantial amount of polymer to the hydrocarbon blend components set forth above improves the sealing, bridging, propping, viscosity increasing, and selective plugging characteristics of the hydrocarbon material. A preferred hydrocarbon to polymer blend ratio is between about 20 to 1 and about 1 to 1.

In the production of the hydrocarbon-polymer particles of this invention, one technique of manufacture comprises subdividing the hydrocarbon-polymer blend in the molten state within a body of a non-solvent liquid such as water which can, but need not, contain a finely divided coating solid. It is important that the non-solvent liquid not contain any material capable of forming stable colloidal dispersions or emulsions of the hydrocarbon-polymer blend when violent agitation is used for subdivision. The subdivided molten material, maintained in constant movement while cooling below the melting point of the hydrocarbon-polymer blend, usually assumes a particle shape of minimum surface, i.e., a spheroid. Cooling or quenching of the subdivided hydrocarbon-polymer material can be carried out in any convenient manner, but usually comprises the introduction of large amounts of additional, cool non-solvent liquid to the subdivided particles dispersed in the original body of non-solvent liquid.

It is found in hydrocarbon-polymer blend subdividing operations using violent agitation, i.e., stirring, pump mixing, etc., that it is necessary to have present in the non-solvent liquid a suspension of a finely divided solid such as calcium carbonate which uniformly distributes itself over the surface of the spheroids as they form, thus providing a coating for the hydrocarbon-polymer spheroid particles. This coating of fine solids prevents subsequent coalescence of particles subdivided by violent turbulent agitation as with stirrers, colloid mills, pump mixers, and the like. The coating also minimizes agglomeration while cooling to a point below the melting point of the hydrocarbon-polymer blend, and further prevents adhesion of the spheroids during subsequent handling of the solid particles in manufacture and storage.

The spheroidal particles, coated or uncoated, separate readily from the non-solvent liquid as a particulate spheroidal solid phase and can readily be packaged for subsequent use. The material can be either dried by draining, which forms a relatively high moisture blend product but which, nevertheless, does not agglomerate or otherwise have characteristics which hinder its handling. However, the spheroidal blend particles can be dried by forced air or any other conventional means of drying or moisture removal to provide a substantially moisture-free product which is also free flowing and non-agglomerating.

In the preparation of wax emulsions, finely divided inert solids are frequently employed as loading or flatting agents or for the purpose of adjusting the pH of the emulsion. However, in preparing such compositions, the object is to produce a stable emulsion or colloidal dispersion and to achieve this object it is necessary to provide emulsifying or dispersing agents which disperse both the wax and the inert solids. In the process of the present invention, however, in order that the hydrocarbon-polymer blend particles are in the preferred range of 4 mesh to 100 mesh U.S. sieve and can be separated easily from the non-solvent liquid, it is essential that emulsification or stable dispersion of the hydrocarbon-polymer blend be avoided. Emulsification or stable dispersions of the inert coating solids should likewise be avoided in order to permit the finely divided inert solids, when used in the manufacture of my spheroids, to be deposited on the surface of the hydrocarbon polymer particles. Thus, an essential and distinguishing feature of the process of manufacturing my spheroids for subterranean treatment of oil or gas bearing formations lies in the fact that the dispersion of the hydrocarbon-polymer molten blend is carried out in the substantial absence of any materials capable of promoting the formation of stable emulsions or colloidal dispersions of either the hydrocarbon-polymer particles, or the inert coating solids, when used. However, the criticality of this non-emulsifying material requirement is minimized when my preferred particle isolation manufacturing technique, hereinafter discussed, employing angular injection of the hydrocarbon-polymer blend into the non-solvent liquid, is used.

The non-solvent liquid within which the hydrocarbon-polymer blend is dispersed or subdivided in accordance with the previously described spheroid manufacture can be any liquid in which the hydrocarbon-polymer blend is both essentially immiscible in the molten phase and substantially insoluble in the solid phase. Preferably, such non-solvent dispersing liquid has a normal boiling point substantially above the melting point of the hydrocarbon-polymer blend, but liquids normally boiling lower than the hydrocarbon-polymer blend can also be used. When substantially lower boiling liquids are used, the hydrocarbon-polymer blend dispersion can be carried out under superatmospheric pressures. Water is preferred as the non-solvent liquid for hydrocarbon-polymer dispersion, but any other liquid meeting the requirements set forth above is satisfactory and these other liquids can be either utilized alone or when compatible in admixture with water. Other non-solvent liquids include such organic liquids as glycols, highly polar hydrocarbons, and the like which are particularly usable when the plugging or sealing material being manufactured is a wax-polymer blend. A preferred temperature for water as a non-solvent liquid for use in the dispersion of wax-polymer blends is in the range of about $200° \pm 10°$ F. The volume of non-solvent liquid utilized can be of any volume which provides a sufficient body of liquid for dispersion of the subdivided hydrocarbon-polymer blend therein and usually is at least equal to the hydrocarbon-polymer blend volume. Preferably, the volume of non-solvent liquid employed for dispersion is considerably greater than the volume of hydrocarbon-polymer blend, e.g., from 2 to 25 times larger.

In the production of the spheroidal hydrocarbon-polymer particles preferably used in the treating processes of this invention, it has been found that the use of finely divided coating solids suspended in the non-solvent liquid dispersing medium is not necessary, particularly when using my preferred angular injection dispersion method, hereinafter discussed. When finely divided coating solids are used, then the finely divided solid material should be substantially insoluble in both the non-solvent liquid and the hydrocarbon-polymer blend, and furthermore should be a solid material which does not promote the formation of emulsions, foams, or colloidal dispersions. This finely divided solids parting or non-agglomerating agent can be a salt of any of the metals of Groups II, III, IV–A, V, VI, VII, and VIII of the Periodic Table. Examples of such metals include barium, lead, calcium, iron, chromium, and the like, and examples of the salts include barium sulfate, lead sulfate, calcium carbonate, ferric carbonate, chromium sulfide, calcium sulfate, and the like. Also the oxides and hydroxides of these metals, e.g. calcium oxide, calcium hydroxide, magnesium hydroxide, zinc hydroxide, aluminum oxide, ferrous hydroxide, cupric hydroxide, strontium hydroxide, ferric hydroxide, zinc oxide, cobalt oxide, vanadium oxide, titanium dioxide, manganous hydroxide, chromium hydroxide, and the like can be used. Particularly preferred for use in coating the hydrocarbon-polymer treating materials of this invention is calcium carbonate, e.g., a commercial calcium carbonate such as Purecal U which has a particle size range of from about 0.033 micron to about 0.040 micron or Purecal M which has a particle size range of from about 0.10 micron to about 0.35 micron. Other finely divided coating solids which can be used include clay, bentonite, kaolin, fuller's earth or other aluminum silicates, limestone, and crushed oyster shells. Furthermore, organic solids which have the required characteristics for a finely divided solid coating or parting agent can be used, e.g., synthetic resins such as polystyrene, polyethylene, polyvinyl acetate, cellulose acetate, and the like.

The particle size of the finely divided solid coating material for the above-described particle manufacturing technique can be any particle size which can be sufficiently suspended in the non-solvent liquid dispersing medium by agitation, stirring, or otherwise so as to provide a finely divided solid cloud for the hydrocarbon-polymer particles to pass through. The finely divided coating solid can be suspended in the hot non-solvent liquid stream in which the hydrocarbon-polymer melt is first dispersed, or in a modification of my spheroid manufacture the finely divided solids can be suspended in the cooling or quench zones of the spheroid manufacturing process, i.e., subsequent to the subdivision of the hydrocarbon-polymer melt. Particle sizes of this finely divided coating solid in the range of 100 mesh U.S. sieve or smaller are particularly suitable, e.g., from about 100 mesh to about 0.02 micron, but particle sizes both substantially larger and substantially smaller are suitable.

The amount of finely divided coating or parting solid employed can be varied over a very wide range. It is found that the addition of any amount of finely divided coating solids to the non-solvent liquid dispersing medium provides some non-agglomerating characteristics during manufacture and improved storage and handling characteristics for all of the hydrocarbon-polymer blend compositions of my invention. In proportion to the non-solvent liquid dispersing medium, the finely divided coating solids will usually comprise from about 0.5 percent to about 30 percent of the weight of the non-solvent liquid. It has been found, for example, that for hydrocarbon-polymer spheroids subjected to high temperature storage, a preferred amount of finely divided coating solids suspended in the non-solvent liquid is between about one percent and about ten percent of the weight of the non-solvent liquid, the particular percentage used depending upon the particle size of the finely divided solid, the compositional nature of the hydrocarbon-polymer blend, the characteristics of the non-solvent liquid, and the ratio of non-solvent liquid to hydrocarbon-polymer blend.

The manufacture of the hydrocarbon-polymer particles used in the plugging, sealing, propping, and other treating methods of this invention can be carried out in many different ways. The blends can be particulated by molding, prilling, spraying, extruding, shredding, or disintegrating in any other conventional manner and the dispersing fluid body can be either a liquid or a gas. According to one mode of manufacture of the preferred spheroidal particles, the non-solvent dispersing liquid is heated to a blending temperature substantially above the melting points of the components of the hydrocarbon-polymer blend, e.g., such blending temperatures for wax-polymer blends being typically in the range from about 300° F. to about 450° F. However, depending on the hydrocarbon and polymer components, this blending temperature can be substantially higher or lower than this typical range. The melted blend is then added to the hot non-solvent dispersing liquid body, and the mixture is vigorously stirred as with a propeller stirrer or otherwise subjected to dispersion by violent turbulent agitation, e.g., colloid mill, homogenizer, and the like, until the introduced blend is split into small droplets or particles. The size of the hydrocarbon-polymer blend particles in this method of manufacture is largely dependent upon the non-solvent liquid and the particular agitation equipment employed to perform these steps.

Without interrupting the violent agitative stirring, the finely divided coating solid is then added and stirring is continued for several minutes until the appearance indicates that the molten hydrocarbon-polymer droplets have become coated with the solid. The mixture of hydrocarbon-polymer particles, non-solvent liquid, and coating solid is then allowed to cool or quench by the addition of cool non-solvent liquid or by other heat dissipating means whereupon the coated hydrocarbon-polymer droplets solidify to form a multitude of individual non-agglomerating solid hydrocarbon-polymer particles. Typically, with water as the quenching liquid, the temperature range preferred is from about 100° F. to about 150° F. for wax-polymer blends, the particular temperature chosen being dependent upon the melting point of the wax-polymer blend. The solid hydrocarbon-polymer particles are then separated from the non-solvent liquid. If desired, traces of non-solvent liquid on the particles can then be removed by draining, air drying, centrifuging, or other methods of moisture removal. Alternatively, the spheroids can be maintained in suspension with the non-solvent dispersing liquid, e.g. water, and pumped to storage or other use. Storage of these blend spheroids in a non-solvent fluid suspension provides convenient handling with minimum cost. An alternative mode of coating the hydrocarbon-polymer solids comprises adding the finely divided coating solids to the body of non-solvent liquid prior to the addition of the molten hydrocarbon-polymer blend. Also, if desired, the hydrocarbon-polymer composition can be introduced into the non-solvent liquid in solid form, the mixture then heated to melt the blend and the mixture stirred with the finely divided dispersing solid being added in one of the manners above-described.

A particularly preferred method of manufacture of the spheroid hydrocarbon-polymer product of this invention employs a novel particle parade or particle isolation technique utilizing injection of the fluid blend into a flowing non-solvent fluid body, which method has many significant advantages over prior techniques of hydrocarbon-polymer spheroid manufacture. Among these advantages are substantially uniform spheroidicity and size of the manufactured beads, ease of size control of the spheroid particles, no particle agglomeration during manufacture either with or without the use of a finely divided coating solid, and simplicity of process apparatus and operation. The improved bead or spheroid manufacturing process of my invention essentially comprises melting the hydrocarbon-polymer blend and injecting the molten blend into a moving stream of hot non-solvent liquid, the non-solvent liquid being preferably heated to a temperature above the melting point of the blend, whereby the force of the non-solvent stream separates portions of the blend stream into discrete blend particles.

The axis of injection of the molten blend, preferably flowing at a relatively high velocity into the moving non-solvent liquid stream, is preferably located at an acute angle relative to the flow axis of the moving non-solvent stream. This angular blend injection is preferably in an upward direction into a horizontally moving non-solvent liquid stream, i.e., for best results the hydrocarbon-polymer melt should not be injected at an angle downwardly into the moving stream. Furthermore, while any transverse injection such as vertical or perpendicular injection is operable, other injection systems are not usually as satisfactory as the aforesaid acute angular injection. Preferably also, where the axis of angular blend injection intersects the axis of the non-solvent liquid stream, the hydrocarbon-polymer blend stream has a flow velocity component in the same direction as the direction of flow of the hot non-solvent stream. The acute angle between the axis of these two intersecting streams, i.e., non-solvent liquid and hydrocarbon-polymer blend, is preferably any angle substantially less than 90°, and particularly preferred are those angles between about 15° and about 75°, with a particularly efficacious and convenient angle of injection occurring at about 45°. However, any injection transverse to the axis of flow of the non-solvent stream can be operable in producing particle isolation.

The particle size of the spheroids formed by my particle isolation method of dispersion can be conveniently varied in mean diameter by controlling a number of the process and apparatus variables. It is also found that substantially uniform sized particles can be made using my preferred particle isolation technique, i.e., a relatively narrow range of particle sizes such as from 4 mesh to 20 mesh U.S. sieve. The injection velocity of the hydrocarbon-polymer blend into the hot non-solvent dispersing liquid, of course, controls the frequency at which a suitable mass of the hydrocarbon-polymer blend is available for shearing or stressing by the hot non-solvent liquid stream. The velocity of the stream of hot non-solvent liquid into which the hydrocarbon-polymer blend is injected determines the shearing force and/or tensive force available for separating individual particles from the incoming flow stream of hydrocarbon-polymer blend. The particle size is also critically influenced by the angular injection since the size of the injecting orifice formed by the conduit opening through which the hydrocarbon-polymer blend is introduced into the body of non-solvent liquid, in combination with the angle of injection as previously discussed, controls the volume of hydrocarbon-polymer blend exposed to a buoyancy effect which is related to the relative specific gravities of the hydrocarbon-polymer blend and the non-solvent liquid. By buoyancy effect I mean the tendency of my typical hydrocarbon-polymer blends to rise, because of differences in specific gravity, through a body of non-solvent liquid. Other factors influencing spheroid size include the temperature and composition of the hydrocarbon-polymer blend being injected since the viscosity is both temperature and composition dependent and viscosity is partially determinative of the shearing force and tensive force required for spheroid particle formation by my flowing stream technique of subdivision and particle isolation. Generally then, my particle isolation technique is operative in any system or arrangement where the shearing force and tensive force applied by the force of the flowing non-solvent stream to the incoming blend stream is sufficient to disperse discrete substantially uniform portions of the blend stream at substantially uniform intervals into the non-solvent stream.

Although it is not completely understood why my preferred angular injection in the particle isolation dispersion method of this invention produces such a controllably superior spheroidal product, it is believed that some of the major factors are those set forth above. I have further found that when the injecting orifice is connected by means of a vertical conduit to the bottom of a horizontal conduit carrying a flowing stream of non-solvent liquid, the spheroidal blend product formed is less satisfactory than with angular injection in that apparently the intrinsic buoyancy of the hydrocarbon-polymer material permits it to rise into the non-solvent liquid flowing stream in large random-sized masses, thus producing large agglomerates of a less satisfactory degree of spheroidicity and size uniformity. Furthermore, when the injection conduit is entering from either an angle or a perpendicular above the horizontal non-solvent liquid conduit, it is found that again the product formed is less satisfactory and the spheroidal and non-agglomerating nature of the product is reduced. However, when the blend is introduced at an angle from below into a horizontal flowing non-solvent liquid stream, I have found that the wedge of hydrocarbon-polymer blend which is exposed to the flowing stream at any instant has an intrinsic buoyancy which contributes to a controllably uniform spheroidal particle shape and size.

Although the particle size range of particular interest to this invention, i.e. from about ¼ inch mean diameter to about 100 mesh U.S. sieve, is conveniently made with my angular injection system, any spheroidal particle size can be made with my apparatus, e.g. hydrocarbon-polymer spheroids one inch and more in diameter can be readily produced as well as spheroids as small as 300 mesh U.S. sieve and smaller. These very large and very small hydrocarbon-polymer spheroids, when coated with a dispersing or parting agent, all have the advantageous storage, packaging, transporting, and handling characteristics hereinabove discussed with relation to the intermediate spheroid sizes, i.e., from 4 mesh to 100 mesh U.S. sieve.

I have found that the use of a dispersing or coating solid with my particle isolation blend dispersion method is not required, and particle dispersion with formation of non-agglomerating spheroids takes place in the non-solvent liquid containing no dispersing or coating agent whatsoever. The spheroid particle parade which occurs in my blend injection apparatus and method minimizes the need for a parting agent during spheroid formation and/or cooling. Thus, the particle separation inherent in my hydrocarbon-polymer blend injection technique of dispersion provides individually created particles which are continually isolated by the flow of hot non-solvent liquid. Thus, my particular blend injection, in combination with my particle parade, induces separation during cooling and quenching and provides solid particles, coated or uncoated, which have no tendency to agglomerate at room temperature. However, it is often desirable to use a finely divided solid dispersing or coating agent and the method of operation set forth herein is completely operable using the finely divided coating solids as previously discussed in relation to other methods of bead manufacture.

The dispersed or subdivided particles produced by my particle isolation by blend injection can be cooled and/or quenched and then removed from the non-solvent liquid medium in the same manner previously discussed in relation to other methods of manufacture. The non-solvent liquid is usually recirculated in the process as is the finely divided dispersing or coating solid when used. A preferred method of cooling and quenching the hydrocarbon-polymer particles is to allow the sequentially parading stream of freshly subdivided hydrocarbon-polymer particles, now somewhat spheroidal in shape although still molten or semi-molten, to pass into a cooling and/or quenching zone wherein the particles are cooled to a temperature level where they become solids. One preferred system comprises allowing the particles to rise individually by their natural buoyancy through a relatively slow non-solvent liquid velocity residence vessel or tank where their individual velocities are substantially reduced from the hydrocarbon-polymer particle velocity existing at the time of subdivision (blend injection). A cooling jet of liquid is preferably introduced into this residence vessel or accumulator tube in such a manner as to not interfere either with the particle isolation during cooling or with the upward buoyant velocity of the spheroidal particles, yet provide a substantial cooling or quenching effect by dilution of the original hot non-solvent liquid with cooler non-solvent liquid. A tangential non-solvent liquid jet giving a slight vortex action to the fluid in the upper portion of the residence vessel is particularly satisfactory.

It is to be understood that a multiplicity of injection systems can be used, either using a common hot non-solvent flow line with multiple blend injection points in the single common flow line or using multiple non-solvent flow lines, each having its own blend injection line. When multiple blend injection systems are utilized, the cooling and quench systems can be common to all the multiple blend injection operations or each injection system can have its own individual cooling and quenching system. As many as sixteen blend angular (45°) injection points have been operated simultaneously with an overall spheroid production rate, 4 mesh to 100 mesh U.S. sieve, of about 40,000 pounds per month on an 8 hour per day operational basis.

The solid hydrocarbon-polymer material of this invention has unique oil well and oil formation treating characteristics and properties not possessed by either the hydrocarbon or the polymer alone. In particular, my hydrocarbon-polymer blend particles are oil soluble solids with appropriate softening points, melting points, and rate of solubility in hydrocarbon fluids to meet the formation or well treating requirements. It is this novel material with its unusual properties that I have found to have extensive application in a wide variety of oil well and oil formation treating operations. Although many of the advantageous physical and chemical properties of my hydrocarbon-polymer blends do not depend on physical shape, I have found that the spheroidal shaped hydrocarbon-polymer particle is highly preferred for all subterranean formations and well treating operations. One particular advantage to the spheroidal particle lies in its ability to pass readily through slots in well liners where the slot size is the same or substantially smaller than the spheroid diameter, e.g., with a 3/16 inch slot size, a ¼ inch particle can pass easily without bridging or particle degradation. This contrasts with conventional plugging or sealing particle shapes which are shredded, granular, fiber-like, fibril, flaked, and random shaped as formed by crushing, tearing, chopping, slicing, and the like. Thus the spheroidal hydrocarbon polymer beads of this invention are preferably used for slotted liners, and are equally effective in all other conventionally completed wells, e.g., perforated completion. The particularly unique feature of my hydrocarbon-polymer particles, preferably spheroids, is that in any one oil well injection or application, they can fulfill any one or all of the following functions: (1) anti-fluid loss agent; (2) selective plugging agent (temporary for hydrocarbon, permanent for water); (3) temporary propping agent; (4) temporary plugging or sealing agent; (5) diverter (sealant) to produce multiple fracture; and (6) carrier and formation fluid viscosity increaser in situ, e.g., at the hydrocarbon-polymer solid location in the formation.

Carrier fluids for fracturing or other well treating operations with the hydrocarbon-polymer particles of this invention can include any pumpable fluid which will place the particles in a position in the formation where they can prop, seal, or otherwise function as needed. Usually, the carrier fluid is injected into a well at a cool temperature, i.e. a temperature substantially below the formation temperature. In fracturing for example, a fluid such as crude oil, kerosene, acid, water, viscous water, or the like is pumped into the formation under high pressure to form a new fracture or enlarge an existing fracture. Then a carrier fluid with a propping agent slurried therein, either containing a permanent prop alone or containing both permanent and temporary props, is used to place the suspended propping agent in the fracture. This carrier fluid can be unmodified crude oil or water or some fluid such as crude oil or water which has been modified to increase the propping agent suspension power of the fluid, or can be one of the typical fracturing fluids mentioned above. Other fluids which can be used as carrier liquids include other liquid petroleum hydrocarbons such as gasoline and other crude petroleum oil fractions, with or without viscosity increasers, gelling agents, and the like. Typical viscosity increasers for carrier liquids include soaps, resins, and the like, all of which are compatible with my hydrocarbon-polymer sealing agent. Preferably then, the hydrocarbon-polymer particle carrier liquid is a liquid which has less tendency than water or oil to filter through the formation. However, because of the excellent sealing characteristics and substantial insolubility at surface temperatures many of my hydrocarbon-polymer particles, any pumpable fluid is satisfactory since fluid loss is minimized by the rapid formation sealing and the carrier fluid viscosity is not altered during the initial injection by my hydrocarbon-polymer well treating additive.

The hydrocarbon-polymer particles of this invention are particularly useful as temporary propping and plugging additives for fracturing fluids. Thus, the hydrocarbon-polymer particles are respectively designed to maximize fracture flow capacity and to minimize flow into a propped fracture. With the use of the hydrocarbon-polymer temporary plugging additive of this invention, a substantially greater efficiency can be achieved for hydraulic formation fracturing. The hydrocarbon-polymer particles of this invention are conveniently mixed with a carrier fluid in the same manner as other propping agents, and the resulting mixture is then employed in conventional fracturing operations, usually at selected elevations in the formation. The preferred temporary propping and plugging elements of this invention are spheroidal in shape and deformable under pressure so that they are ideally suited for placement along with permanent propping agents and for forming stable bridges and temporary seals across openings in the formation matrix. For example, the formation can be plugged or sealed off by the hydrocarbon-polymer particles in the initial stage of the fracturing operation, and then a deep-penetrating fracture induced by pumping a fracturing fluid at a higher rate and higher pressure. Then, when a new fracture in this multiple fracture operation is formed, hydrocarbon-polymer particles in admixture with a permanent propping agent are thrust deep into the new fracture and function there as a temporary propping agent. The fracturing fluid pressure and rate are then reduced to permit the over-burden pressure partially to close the fracture to the height of the propping agent. A fluid suspension of the hydrocarbon-polymer particles alone can then be used to form a new temporary seal across the partially closed fracture opening in the matrix. Once again the pressure and flow rate of the fracturing fluid is then increased to bring about fracturing in a new location since leak-off is minimized through the sealed fractures.

One of the required characteristics of the hydrocarbon-polymer particles used in fracturing as a temporary propping agent and seal is that of retaining its shape and size in oil long enough to permit the fracture to occur yet being sufficiently soluble in oil to disintegrate or dissolve completely and readily when the fracture treatment is completed. The temporary propping and sealing material of this invention then has the further particularly advantageous feature of being readily removed from the fracture, and from the well bore, by solution in hydrocarbon formation fluids.

At the completion of the fracturing operation, it has been found advantageous to inject a final or tail-in plugging or sealing portion of hydrocarbon-polymer spheroids to temporarily seal the open ends of the fractures nearest the well bore. This tail-in sealing plug is thus similar to the final sealing step previously discussed with regard to making multiple fractures. The flow of sand into the well bore from the formation is thereby minimized and the phenomenon known as "sand-out" of the well is prevented. Thus, sand bailing can be readily accomplished in a few hours, radio active logging, when required, can be carried out the same day as the fracturing operation, and the well can be placed on production with little delay.

In an example of a typical fracturing operation, in preparing underground formations for fracturing, a fluid stream, such as crude oil in which hydrocarbon-polymer spheroids are suspended, is pumped down the well. The fluid containing the spheroids flows out into the fissures existing in both water and oil-producing formations. Depending upon the size of the existing pores or fissures and the size and size distribution of the spheroids, the hydrocarbon-polymer particles lodge at some point in the existing openings and create a very large resistance to further fluid flow. Additional fracturing fluid, at high flow rates such as several hundreds to several thousands of gallons per minute and high pressures such as several thousand pounds per square inch, is then pumped into the well bore and into the formation. This hydraulic fracturing procedure serves to fracture the formation, creating extensive cracks through which higher oil recovery and/or recovery rates can be realized. The higher flow rates inherent in hydraulic fracturing are thus improved because of the solution in formation hydrocarbons, after a short time, of the hydrocarbon-polymer spheroids which were used for the plugging. The hydrocarbon-polymer particles of this invention are extremely efficacious for this service because particle size and shape can be controlled by my method of manufacture. Further, the softening point, melting point, and solubility characteristics can be altered and controlled as desired to meet conditions of formation temperature and formation fluids present by modifying the composition of the hydrocarbon-polymer blend.

A substantial portion of the temporary sealing particles, usually spheroidal hydrocarbon-polymer beads, which enter into an induced fracture during the peak pressure operation, serve a unique function within vertical fracture openings in cooperation with other permanent propping materials usually present in fracturing fluids. It is believed that low fluid loss fracturing tends to produce vertical fractures and the hydrocarbon-polymer spheroids of this invention migrate into a vertical fracture and, by virtue of the low specific gravity or buoyancy attained by composition control, minimize the falling of the sand or other permanent propping agent within the fracture opening and provide substantial spacing between permanent propping particles. This buoyancy effect holds the sand or other permanent propping agent in place in a substantially stable mechanical structure in the vertical fracture. Then, when the fracturing operation is complete, these temporary hydrocarbon-polymer props dissolve leaving a permeable vertical fracture held open by widely spaced permanent propping agents for oil production.

A still further advantage in fracturing in combination with sand or other permanent propping agents with these hydrocarbon-polymer spheroids is that, while the spheroids do not prevent the sand from being crushed when the pressure is first released on the fracture, the deformable characteristics of my hydrocarbon-polymer particles or spheroids tend to maintain the crushed pieces of sand closely packed together. Thus, the effectiveness of the permanent sand propping agent is not completely lost by the effect of the overburden pressure although some crushing takes place at the completion of any fracture. The temporary propping elements, i.e., the hydrocarbon-polymer particles, can be removed readily from around the permanent propping agent particles by the flow of produced well crude from the formation since these spheroids are soluble in the hydrocarbon formation fluid at the formation temperature, and thus, in a predetermined time, can be dissolved in the crude oil. Also, the hydrocarbon-polymer spheroids used for temporary propping have a substantial physical strength of their own which aids the permanent propping agents in initially supporting the overburden load. In the placement of a mono-layer of propping agent in horizontal fractures, the spheroidal shape permits rolling and thus contributes markedly to the ease and density of placement although other shaped particles are operable for any temporary propping service. When the temporary plug dissolves, this results in a highly porous partial mono-layer of permanent propping agent.

It has been found that the addition of any amount of the hydrocarbon-polymer particles of this invention to the carrier fluid is helpful during the propping step in fracturing operations. A preferred concentration of my hydrocarbon-polymer particles as a temporary sealing additive is between about 15 and about 25 pounds of hydrocarbon-polymer solids per 42 gallon barrel of carrier fluid, but when the hydrocarbon-polymer blend particles are used as temporary propping agents, the concentration is usually higher, e.g., 1 to 5 pounds per gallon of carrier fluid. The proportion of temporary propping agents to permanent propping agents in a propping mixture is usually selected so that after removal of the fracturing pressures and dissolution of the temporary propping agent, the remaining propping agent has sufficient crushing strength to resist the overburden pressure and hold the fracture open to the maximum fracture flow capacity. Usually, the temporary propping agent particles comprise not more than half of the total number of propping agent particles. Permanent propping materials which typically are used in combination with the hydrocarbon-polymer spheroid particles of this invention are strong hard solids which are chemically inert and resistant to solvent action and elevated downhole temperatures, preferred materials being solids such as ground nut shells, e.g., walnut shells, peach seeds, plastic, coarse sand, or the like. Preferably, all propping agent particles, both temporary and permanent, used in this invention are spheroidal in shape to enhance placement in the formation fissures.

When used as propping agents, the hydrocarbon-polymer particles are preferably not only spheroidal, but it is also preferred that the size range for each step of a fracturing operation be relatively narrow and uniform. Thus, for admixture with the permanent propping agent, the temporary propping agent particles should be substantially the same size as the permanent propping agent, and normally range from about 4 mesh to about 100 mesh U.S. sieve. The most commonly used sizes are 8 mesh to 12 mesh U.S. sieve or 12 mesh to 20 mesh U.S. sieve, the particular range used depending on the type of formation being fractured. In contrast, when the hydrocarbon-polymer particles are used for sealing in this invention, they are preferably provided in a relatively broad gradation of particle sizes. Bridging is apparently improved by a wide range of particle sizes and typical sealing or plugging materials used in all of my oil well and oil formation treating processes where plugging or sealing is predominant usually have a gradation of particle sizes between the range of about 4 mesh and about 100 mesh U.S. sieve. However, much larger particles can be used for filling formation caverns and much smaller particles can be used for sealing formation pores. Usually for sealing and plugging, the hydrocarbon-polymer particle size distribution is adjusted such that the particles in the range of about −4 mesh to about +10 mesh U.S. sieve constitute about one half of the material and the particles in the range of about −10 to about +100 mesh U.S. sieve constitute the other half of the material.

The hydrocarbon-polymer blend material made with liquid hydrocarbons, e.g., 70 percent 300 neutral oil and 30 percent kerosene, are especially useful in soft or incompetent formations. The particulate materials formed in those blends using liquid hydrocarbons have characteristics of toughness, flexibility, and high solubility in formation fluids and are ideally suited for forming temporary seals across porous surfaces in a formation. Once the formation is fractured, this soft material flows into and plasters the fracture and fissure openings and induces deep-penetrating fractures by minimizing leak-off from the expanding fracture area surfaces. The characteristics of this rubber-like hydrocarbon-polymer temporary plugging agent can be established by altering the blend ratio and composition to fit the needs which arise from the bottom hole conditions of the well.

It is to be understood that in any fracturing operation, or any other oil well or formation treating, the particular hydrocarbon-polymer particles used depends on the carrier fluid, the formation temperature, the desired temporary plugging period, the physical strength needed if used as a propping agent, and the like. The hydrocarbon-polymer particles can comprise particles of a single blend or a mixture of particles of different blends wherein the blends have substantially different characteristics. For example, a soft hydrocarbon-polymer spheroid might be used to create plugs while in admixture therewith is a relatively rigid hydrocarbon-polymer spheroid for use as a temporary propping agent. Furthermore, any of the homogeneous hydrocarbon-polymer blends used in this invention can, if desired, include other components which lend some specific property to the blend. For example, a wax-polymer blend might also include naphthalene, asphalt, a liquid hydrocarbon oil, and the like.

Another particular use of the spheroids of this invention involves the sealing of a formation structure against lost circulation in oil well drilling using water base, oil base, or water-oil emulsion drilling fluids. In the drilling of wells for oil, gas, sulphur, and the like wherein a fluid is used in connection with the drilling operation, as well as in the other well treatments such as fracturing, cementing, formation treatments such as oxidizing, water block removal and the like, it is usually necessary to prevent the dispersion of the drilling fluids in the well into the formation. This loss of fluid, commonly known as lost circulation, takes place where formations are fractured or gravelly or cavernous or subject to separation by hydrostatic pressure such as in squeezing, cementing, and fracturing operations. In general then, fluids such as drilling fluids and perforating fluids when contained in a well with exposed formations are found to filter into the formation, but my hydrocarbon-polymer particles can reduce this loss when added to the well fluids. However, conventional lost circulation plugging materials are usually a great problem since not only do they usually prevent the loss of the circulation drilling fluid into the formation, but then they permanently seal or plug the formation after the drilling or other operation is completed thus preventing oil flow therefrom.

The use of the hydrocarbon-polymer particles of this invention in these oil well and oil formation treating operations, i.e., as a component of the drilling fluid, squeezing fluid, cementing fluid, or any other well treating fluid typically dissipated into a formation, reduces the detrimental fluid loss and essentially eliminates lost circulation which is common to these operations. Any amount of hydrocarbon-polymer particles, particularly spheroids, has a beneficial effect in reducing fluid loss. Preferably, the hydrocarbon-polymer particle concentration is between about 15 and about 25 pounds per 42 gallon barrel of well treating fluid. The particle size to be used is dependent on the size of the formation openings and usually is similar to the range previously set forth for plugging or sealing in fracturing operations, i.e., about 4 mesh to about 100 mesh U.S. sieve. The bottom hole temperature of this invention can run from very low temperatures (below the freezing point of water, 32° F.) up to temperatures as high as 450° F. and higher and a selection of the particular blend of hydrocarbon-polymer which is best suited to a particlar fracturing, drilling, or treating operation depends primarily upon the downhole formation temperature. The hydrocarbon-polymer particles used in these operations should therefore be those which readily dissolve in the formation oil or other formation hydrocarbons at the downhole temperature, but have a softening point and/or melting point and a composition which provide a hydrocarbon-polymer particle of sufficient strength at the temperature of the fracturing or carrier fluid that a proper temporary seal can form, and also provide, when desirable, a permanent plugging characteristic in the presence of water at the formation temperature.

Another very important use of the hydrocarbon-polymer particles of this invention is the selective permanent plugging of water producing zones to reduce or eliminate undesired water production. That is, the plugging is selectively temporary for zones where oil is produced and selectively permanent for zones where water is produced. The hydrocarbon-polymer particles, being relatively water-insoluble, shut-off or diminish the flow of water when the particles plug or seal water-producing formations, these particles having a melting point higher than the formation temperature. Thus, as the hydrocarbon-polymer particles rise in temperature to the formation temperature and are exposed to hydrocarbon formation fluids, the hydrocarbon-polymer particles in the oil-producing formation disappear. This selective plugging is made possible by the unique characteristics of the particular hydrocarbon-polymer blend used. The blends are manufactured to have specific properties of dissolution, strength, and the like according to the requirements of the bottom hole conditions in the producing zone. Thus, at a given producing formation temperature and pressure, the hydrocarbon-polymer plug or seal is dissolved away in hydrocarbon oil or gas but not in water. Furthermore, any of the blend particles remaining in the oil producing sand tend to support loose sands, thus providing the additional benefit of minimizing the production of fine sand with the oil coming from a producing zone. Thus, my hydrocarbon-polymer material provides a selective plugging agent having great flexibility in physical properties which satisfies a long felt need in the petroleum industry.

In contrast to most fracturing or treating fluids which rapidly decrease in viscosity when exposed to the high downhole temperature, certain tailored hydrocarbon-polymer plugging additives can change well treating fluid viscosity from a low to a much higher value when they dissolve in the treating fluid. A well treating fluid then can have at least three different types of hydrocarbon-polymer particles present, i.e., rigid particles for temporary propping, softer particles for plugging and sealing, and readily dissolved particles for viscosity increasing. Thus a hydrocarbon fracturing or well treating fluid containing my viscosity increasing hydrocarbon-polymer solid particles has a viscosity substantially the same as the viscosity of the facturing or well treating fluid with little or no viscosity change during particle placement in the formation. However, as the fracturating fluid approaches formation temperature, the affect of any hydrocarbon-polymer dissolution is to increase the fluid viscosity thus counteracting the decrease in fluid viscosity because of temperature rise. Of course, any loss of viscosity by the fracturing or treating fluid means a larger leak-off of the fluid into the formation, thus resulting in a loss of fracturing efficiency or treating effectiveness. Prior art attempts to remedy this situation by using more viscous fluids results in much lower fluid injection rates. A lower injection rate in fracturing leads to ineffective treatment, with fractures extending only into a limited area of small radius. Also, at the lower injection rates, the rapid decrease in viscosity tends to cause sand-out in the bottom hole area. Thus, in my process, the injection rate is advantageously maintained at a high level and the hydraulic fracturing or treating fluid can be of a relatively low viscosity with no viscosity change induced by containing solid hydrocarbon-polymer spheroids or particles during descent. Then after the fluid has reached the well bottom or formation to be treated, the fluid increases in viscosity due to the dissolution of the viscosity increasing hydrocarbon-polymer particles. Essentially then, by composition control, the dissolution rate of a particular hydrocarbon-polymer blend is established so as to increase the treating fluid viscosity at the desired location in the well or formation. This viscosity increasing feature of my materials has many uses in oil well and oil formaiton treatment where viscous slugs, formed in situ, have a great advantage, e.g., secondary recovery processes such as water flooding, gas flooding, oil flooding and the like.

The following examples specifically illustrate: (1) the method of manufacture of my hydrocarbon-polymer spheroids; (2) many of the properties of my hydrocarbon-polymer spheroids; and (3) the practice of the oil well and oil formation treating processes of my invention.

*Example I*

Wax and polymer materials were mixed and melted in a large melt tank, the tank being indirectly heated with hot oil and having both paddle agitation and recirculation pump stirring, as the first step in making wax-polymer spheroidal particles. The first component was 33 slabs of a 130°/134° petroleum base paraffin wax comprising about 367 pounds which was 53% of the total blend by weight. The second component was 21 slabs of a 143°/150° petroleum base paraffin wax comprising about 233 pounds which was 33% by weight of the final blend. The third and final component was "Elvax 240," an ethylene/vinyl acetate copolymer comprising about 100 pounds which was approximately 14% of the total weight of the blend. Thus, the total wax-polymer blend comprised about 700 pounds. The molten wax-polymer blend was pumped from the melt tank in steam traced piping and was injected through a ¼ inch I.D. line at a 45° angle at a rate of about 0.7 pound/min. into the bottom of a horizontal ¾ inch standard pipe containing a hot aqueous calcium carbonate solution at a temperature of about 205° circulating at a rate of about 1.69 gallons per minute. The hot water non-solvent dispersing medium contained about 10 pounds of finely divided $CaCO_3$ (Purecal M) per 100 gallons of tap water. The temperature of the wax was in the range of 220° F.–225° F. when injected. The angle of blend injection was such that the horizontal velocity of the blend stream was in the same direction as the direction of flow of the water stream in the ¾ inch pipe. The beads, after being dispersed in the hot calcium carbonate non-solvent medium flowing in the ¾ inch pipe, were passed to a quench zone comprising a vertical residence vessel and thence passed to a cooling tank where a large warm water reservoir was used to complete the cooling of the beads. The vertical residence vessel had a diameter of about 5 inches and a length of about two feet. The cooling water was kept at a temperature of about 110° F.±5° F. in the warm water reservoir which was a galvanized can having a volume of about 50 gallons.

The production of substantially uniform spheroids (beads) was accomplished producing a mesh range of spheroidal particles generally running as tabulated below:

| Mesh (U.S. sieve) | Percent by weight retained |
| --- | --- |
| +12 | 45.3 |
| +16 | 37.2 |
| +20 | 13.5 |
| +30 | 3.1 |
| +40 | 0.3 |
| Less than 40 | 0.6 |

The beads formed were extremely uniform and those beads in the +12 mesh size range had a majority in the general range of about 4 to about 10 mesh U.S. sieve. The spheroidicity of the particles was not only excellent, but these particles were thoroughly coated with calcium carbonate and demonstrated excellent handling and packing characteristics at even elevated temperatures (130° F.) near the softening point.

When the above spheroid production run was performed in exactly the same manner as previously described except that the non-solvent dispersing medium was free of solids, the beads formed were substantially of the same excellent quality, uniformity, and mesh size as previously made with the finely divided $CaCO_3$ coating solid. Thus, in the absence of the finely divided calcium carbonate, wax-polymer spheroids were produced in bulk quantities with no particle agglomeration during manufacturing. However, these spheroids which were produced without a finely divided parting solids coating did not have as good packing or transport characteristics at elevated temperatures as the coated beads. This second run without a coating solid clearly illustrates the ease of manufacturer of spheroidal pellets, in the absence of the previously mandatory finely divided dispersing solid, when the apparatus and methods of my angular blend injection with particle parade are used.

Further production runs of the same blend as above were made with calcium carbonate (Purecal M) concentrations of about 1 and 5 pounds of solids per 100 gallons of water. These runs conveniently produced a completely satisfactory non-agglomerating bead product which had excellent packing and transporting characteristics even at high temperatures (130° F.).

*Example II*

Using the apparatus and techniques as set forth in Example I, except as set forth below, a blend was made of 165 pounds of 143°–150° petroleum base paraffin wax with about 29 pounds of Elvax 240 (polyethylene-vinyl acetate copolymer). The blend, at a temperature of about 220° F., was injected at a rate of about 0.7 pound per minute into the hot (about 210° F.) aqueous dispersion medium containing about 10 pounds per 100 gallons water of $CaCO_3$( Purecal M), flowing in the ¾ inch pipe at a rate of about 1.7 gallons per minute. Quenching was conducted as set forth in Example I with no particle agglomeration or sticking taking place during manufacture. The particles (spheroidal beads) formed were substantially of the same particle size range as those made in Example I with the bulk of the beads running between about 4 and 10 mesh. This material had a softening point of about 145° F. and a melting point of about 160° F. Two more similar batches of this hydrocarbon-polymer were converted into beads as above with substantially the same results.

*Example III*

Using the production apparatus and technique as set forth in Example I, a blend was made of 165 pounds of 165° F. petroleum base paraffin wax with about 29 pounds of Elvax 240 (polyethylene-vinyl acetate copolymer). The hydrocarbon-polymer blend, at a temperature of about 235° F., was injected at the 45° angle of Example I and at a rate of about 0.7 pound per minute into a hot (about 200° F. to 210° F.) aqueous dispersion medium, containing 5 to 10 pounds of calcium carbonate (Purecal "M") per 100 gallons water, flowing in the ¾ inch pipe at a rate of about 1.7 gallons per minute. Quenching was carried out as set forth in Example I with no particle agglomeration or sticking. The spheroid beads were substantially of the same particle size range as those made in Example I with the bulk of the beads running in particle size between about 4 mesh and 10 mesh U.S. sieve. This material had a softening point of about 165° F. and a melting point of about 185° F.

In a modification of this run, the blend injection angle was changed to a 90° bottom entry, thus perpendicular to the direction of flow of the hot calcium carbonate non-solvent dispersing fluid. A second batch of the same weight and composition as above was then run in the same manner as above except for the different angle of blend injection. The beads made were very small or very large with no uniformity in bead size or shape. Many of the beads had long tails or were odd shaped. Also, the flow of the wax-polymer blend was difficult to control as compared to the 45° injection angle previously used. When the 90° entry angle injection pipe was connected to the horizontally flowing calcium carbonate stream from above, instead of from below, the same somewhat erratic results were obtained in a third run repeating the above manufacture.

*Example IV*

In this example, a high melting wax-polymer blend was made into beads using the conventional laboratory dispersion technique. Thirty grams of a 165° F. petroleum base paraffin wax was melted in a 500 ml. beaker and heated to about 250° F. Thirty grams of Dow Experimental Resin X–3488.2 (ethylene-ethyl acrylate copolymer) was melted in a separate beaker by heating to about 350° F. The wax and polymer were then mixed and heated while stirring with a glass rod until the temperature of the blend was about 385° F. About 1,000 ml. of water was then put in a 2,000 ml. beaker with about 100 grams of Purecal U (finely divided calcium carbonate) and the mixture stirred with an electrically driven propeller stirrer while heating to boiling. The wax-polymer blend was then added slowly to the hot stirred calcium carbonate solution. The wax-polymer material readily dispersed forming small, somewhat irregular balls. The entire mixture was then cooled or quenched by adding two heaping handfuls of crushed ice to the 2,000 ml. beaker. The wax-polymer balls were separated from the aqueous calcium carbonate non-solvent dispersing medium and air dried. The wax-polymer bead product formed was tough, yet deformable and had excellent storage and transporting characteristics with no agglomeration at temperatures as high as 130° F. This material had a softening point of about 180° F. and a melting point of about 200° F.

*Example V*

A fifty-fifty blend by weight (100 grams each) of 300 neutral oil and Dow Experimental Resin X–3488.2 ethylene copolymer (ethylene and ethyl acrylate) was heated to 400° F. in a 500 ml. beaker to form a homogeneous molten hydrocarbon-polymer blend. The molten mixture was then poured into a 1,000 ml. beaker containing water at 212° F. with finely divided calcium carbonate solids present as a dispersing agent. The hot non-solvent liquid (water) in the beaker was agitated with a propeller stirrer during the addition of the hydrocarbon-polymer blend and spheroidal particles were quickly formed. The contents of the beaker were then quenched with a heaping handful of crushed ice and the hydrocarbon-polymer beads were separated from the water phase. The spheroidal beads formed were generally uniform in geometry, but contained many odd shaped beads and many particles with tails as is typical of particles formed in batch turbulent agitation dispersion. The particle size distribution was similar to that found in most methods of bead manufacture, i.e., from about 20 to about 100 mesh U.S. sieve. The beads were deformable, yet quite tough and resilient, resembling a soft rubber in general texture and consistency. The particles were non-agglomerating and had satisfactory shipping and storage characteristics for commercial use, but there was a substantial amount of oil sweating which became apparent upon extended storage. A second blend was manufactured exactly in the manner set forth above except a 90 neutral oil was substituted for the 300 neutral oil and the resulting particles were substantially the same as those made with 300 neutral oil.

*Example VI*

A further 200 gram light hydrocarbon oil-polymer blend was made using 50% by weight Dow Experimental Resin X–3488.2 ethylene copolymer (ethylene and ethyl acrylate) and 50% by weight 150 bright stock blending oil. Beads were formed in the same manner as described in Example V. After about 24 hours of storage at room temperature, there appeared to be a slight sweating of oil from the beads made in the example which kept the bead surface oily. When these beads, formed from light hydrocarbon oils, are made in my continuous particle isolation injection system, previously described in Example I, and are made without a dispersing agent such as calcium carbonate being used in the non-solvent liquid, the oily bead product does not agglomerate or coalesce at ambient temperatures. Particularly with the low molecular weight hydrocarbon oils used in Example V and this example, the oily film which bleeds or sweats from the spheroidal particles keeps the particles separated or lubricated therebetween thus apparently eliminating any agglomeration at room temperatures.

Example VII

Another blend (by weight) was prepared from 70% kerosene and 30% Dow Experimental Resin X–3488.2 (a copolymer of ethylene and ethyl acrylate) and beads were made in the same manner as described in Example V. These beads were tough, flexible, soft yet rubberlike, and while readily deformable they retained a substantially spheroidal shape during packaging, handling, and the like. Furthermore, these coated beads remained dry upon storage and exhibited none of the oil sweating of Examples V and VI. It is believed this is related to the straight chain nature of the hydrocarbons in kerosene which produces an essentially homogeneous hydrocarbon-polymer blend. Thus, none of the feed components are free to migrate or sweat. In constrast, the oils used in V and VI contain naphthenic components which are believed to lack complete compatability with the addition polymers, thus probably being present, partially at least, as heterogeneous components of the beads formed in IV and V. A second blend was prepared exactly as above except a jet fuel (JP–4) was substituted for the kerosene and substantially the same product resulted.

Example VIII

This test demonstrates one of the particularly advantageous features of the hydrocarbon-polymer particles of this invention and relates to their excellent shipping and storage characteristics. It was found that coated hydrocarbon-polymer spheroidal particles, i.e., manufactured in a system which provides a finely divided solids parting agent coating the exterior of the particles, showed substantially no change in their physical characteristics even when packed tightly in a container and the containers stacked to substantial heights. In this experiment, a cardboard box, having the approximate dimensions of a six inch cube, was filled completely full, using agitation to obtain tight and complete packing, with calcium carbonate coated wax-polymer spheroidal beads comprising the material first made in Example I. The filled cardboard box was covered with the conventional flap lid, placed in a constant temperature oven, and an eleven pound weight was placed on top of the box. After about 48 hours at 110° F., there was no observable change in the beads in the box. After 48 hours at about 120° F., the pellets were found to be solidly packed but loosened up as soon as they were moved. After about 48 hours at a temperature of about 130° F., these coated beads were solidly packed and slightly deformed where they touched the box, but all the spheroids were easily separated by touching or agitation. At 140° F. for 48 hours, the results were the same as at 130° F. Shipment of coated spheroidal beads of this invention is thus easily accomplished with substantially no problems of agglomeration during transport since transporting temperatures seldom if ever exceeded 110° F.

Example IX

Twenty grams of wax-polymer pellets from Example I were mixed with 350 ml. of 300 neutral oil stock in a 250 ml. electrolytic beaker. The beaker containing this mixture was placed in a constant temperature oven at 170° F. and occasionally stirred with a glass rod to determine stability and solubility of the wax-polymer spheroidal beads in hydrocarbon oils. At the 170° F. oven temperature, the beads were dissolved by the oil in about 60 minutes. However, when duplicate mixtures were prepared and treated identically as above except at lower temperatures, the results were quite different. The pellets were dissolved over the week-end (about 48 hours) at 127° F., but at 100° F. the spheroidal beads were still intact after about 48 hours, but some slight dissolution had apparently begun. At room temperature, the spheroidal beads appeared to be unchanged after 48 hours, and little or no change in physical characteristics were observed after several weeks. It should be noted that the industry accepted optimum for bridging or propping agents in a fracturing fluid is about 20 pounds per barrel (42 gal.) of oil which corresponds to my test concentration of about 20 grams per 350 ml. of fluid.

Example X

In a test under substantially the same conditions as Example IX, a group of samples comprising a mixture of twenty grams of temporary lost circulation naphthalene particles of about ¼ inch mean diameter and about 350 ml. of 300 neutral oil were placed in a constant temperature oven at various temperatures to determine the stability of naphthalene under similar solution conditions as found in Example IX. At 170° F., the naphthalene was completely dissolved after about 20 minutes. At 127° F., the naphthalene was completely dissolved after about 90 minutes. At about 100° F., the naphthalene was more than 75 percent dissolved after about 90 minutes. At room temperature, the naphthalene was about 50 percent dissolved after 90 minutes. This series of tests illustrated the much greater solubility of naphthalene particles when compared to the wax-polymer blends of Example IX.

Example XI

A mixture of the wax-polymer beads of Example I in 300 neutral oil was tested in a Waring Blendor to study the effect of shearing and temperature on bead stability. About 20 grams of the spheroidal wax-polymer beads were dropped in a Waring Blendor operating at full speed containing about 350 ml. of 300 neutral oil at room temperature (about 75° F.). After about 150 seconds the spheroids were still intact with no observable change in appearance. After about 240 seconds, the majority of the spheroid beads were unchanged, but a few seemed to have been sheared or appeared slightly smaller. An identical test to that above was made using large (¼ inch mean diameter or greater) naphthalene particles. After about 15 seconds, the naphthalene was completely disintegrated and dissolved in the oil, and the 300 neutral oil was tremendously reduced in viscosity as a result of the dissolved naphthalene.

Example XII

The wax-polymer spheroids first made in Example I were analyzed for ash content to determine the amount of calcium carbonate included within the wax-polymer blend by my angular blend injection technique of bead manufacture. Ash contents were also determined individually for the wax and the polymer used in making these beads. Prior to the ash determination the samples were first washed with a 10% HCl solution to remove any calcium carbonate on the surface and then washed with water. The results of the ash tests were as follows:

| Sample: | Ash (wt. percent) |
|---|---|
| 130°/134° wax | 0.007 |
| Elvax 240 (copolymer of ethylene and vinyl acetate) | 0.003 |
| Wax-polymer beads | 0.026 |

These analyses illustrate that my preferred technique of manufacture does not occlude any substantial amount of the finely divided solids coating agent (calcium carbonate) within the hydrocarbon-polymer spheroids of this invention, thus producing a spheroidal bead product substantially free of impurities except for a light surface coating of finely divided solids parting agent.

Example XIII

The wax-polymer blend of Example IV was tested for solubility and stability characteristics by forming test balls of the blend on the end of stiff 1/16 inch diameter iron wire. The wire was repeatedly dipped into the molten blend of Example I and then repeatedly removed and cooled until a ball formed on the end of the wire which was about one inch long and about 1/4 inch in average diameter. The blend balls were then suspended by the wire in about 100 ml. of room temperature fluid in a 250 ml. electrolytic beaker. The beakers with the fluid were then placed in a constant temperature oven at about 185° F. In 300 neutral oil, the ball softened but was still intact after one hour, but within 15 hours the ball had completely dissolved. However, after one hour in water, the ball was hard and intact. After fifteen hours in water the ball was softened but still intact with no dissolution or disintegration. After 42 hours in water the ball was still relatively firm with little detectable change from the original ball. These tests demonstrate the selective plugging characteristic of my materials wherein high temperature oils or hydrocarbon materials readily dissolve the wax-polymer materials but water has little effect on them, thus permitting selective plugging of water-producing zones in oil-bearing formations.

*Example XIV*

Using the wire ball test of Example XIII, a blend by weight of 55% 165° F. petroleum base paraffin wax, 40% Dow Experimental Resin X–3488.2, and 5% polyethylene (Union Carbide Bakelite DYLT with a molecular weight of about 12,000) was formed into balls on several wires. A ball was suspended in 100 ml. of fracturing fluid (dehydrated and degassed crude) in a beaker at room temperature, and then the beaker of fracturing fluid containing the ball was placed in a constant temperature oven at 185° F. In about 40 hours the ball was off the wire, but a gell-like residue was on the fluid surface. After about 51 hours the ball and residue were completely dissolved. When the test was repeated using a formation crude oil, substantially identical results were obtained. But, with water as the test fluid there was no change in the ball over the 51 hour period, and several weeks later the ball was still intact in water at 185° F. with no observable change in the ball. This blend is particularly suitable for high down hole temperature use where the beads melt out readily from the oil producing parts of the formation after performing a temporary plugging function. But, in the hot water producing parts of the formation, this blend permanently plugs the flow, thus substantially increasing the oil to water ratio in produced well fluids.

*Example XV*

A 350 ml. volume of Edison field crude oil was mixed with 20 grams of the wax-polymer spheroid particles first made in Example I. Likewise, 20 grams of the same wax-polymer blend was mixed with the same volume of 300 neutral oil. These two mixtures were then heated to about 200° F. to dissolve the wax-polymer beads. The resulting oil and wax-polymer solutions were then tested to determine gravity, kinematic viscosity (ASTM Method D-445), and SSU viscosity. Similar tests were also made on the oils alone, the results being tabulated below:

| Sample | A.P.I. Gravity | Kinematic Viscosity at 210° F., cs. | SSU Viscosity at 210° F., sec. |
|---|---|---|---|
| 300 neutral oil | 28.1 | 7.80 | 51.78 |
| 300 neutral oil + wax-polymer | 28.7 | 10.27 | 60.27 |
| Edison crude oil | 18.6 | 8.94 | 55.54 |
| Edison crude oil + wax-polymer | 19.1 | 11.46 | 64.54 |

This example clearly illustrates the substantial increase in viscosity of formation oils and carrier oils when hydrocarbon-polymer beads have been dissolved therein. This contrasts totally with the effect of conventional prior art temporary plugging materials such as naphthalene, which reduce to a considerable extent the viscosity of the oil in which dissolved. When 20 grams of naphthalene is dissolved in the 350 ml. oil portions as above, the viscosity decreases drastically below the viscosity of the 300 neutral oil or the Edison crude oil alone. When twenty grams of a 130°–134° F. petroleum base paraffin wax alone is dissolved in 350 ml. each of the two oils, the resulting viscosities of the mixtures are slightly higher than those of the oils alone, but substantially lower than when the wax-polymer beads are dissolved in the oil. Similarly, when 20 grams of polymer alone (Elvax 240) is dissolved in the above two oils, with great solution difficulty being experienced although using high temperatures, extended periods of time, and high agitation, the viscosity is disadvantageously increased, the viscosity being much higher than that found with the wax-polymer beads.

*Example XVI*

In this particular experiment a special mud pump testing system (described in detail in a paper in Journal of Petroleum Technology, January 1963, volume XV, No. 1, page 90–98, Roland F. Krueger, entitled "Evaluation of Drilling Fluid Filter Loss Additives Under Dynamic Conditions") was used to circulate a mixture of 300 neutral oil and about 20 pounds of the wax-polymer beads of Example I per barrel of oil. A simulated slotted liner was constructed comprising a steel disc welded across one end of a six inch long, 2 inch diameter standard pipe nipple with a 3/16 inch wide slot extending the diameter of the steel disc. The nipple with the simulated slotted liner was attached onto the main flow stream of the mud pump circulation system with the slotted liner end of the nipple abutting the flowing stream in the mud pump system. The open end of the 6 inch long nipple had a valve connected thereto which, when opened, permitted the oil and wax-polymer bead mixture to flow into a barrel. The full stream pressure, about 1,000 p.s.i.g., caused the oil and bead mixture to spurt continuously from the system when the valve was opened. With my wax-polymer beads, it was found that beads having a diameter (3/8 of an inch) almost twice the slot width (3/16 inch) passed with ease through the simulated slotted liner as described above. Thus, the wax-polymer beads did not bridge against the slotted disc, illustrating how a slotted liner does not hinder the flow of my oil-bead mixture from a well-bore into a formation. The nipple was then reversed where it connected to the system so that the flow went through the six inch length of the nipple before it reached the slotted disc. This simulated somewhat the condition where the beads pass through formation openings until a narrow crevice or crack is reached. The wax-polymer beads started to bridge immediately, as they do in a fracture crack, when this was done. The spurt loss was almost nil and the slot in the disc was plugged solid in a few seconds with no observable oil flow subsequently passing through the plug.

*Example XVII*

Two simulated formation fractures were made with test cores, one using an actual core from a Boise sandstone formation which was forced into a one inch diameter, 2 inch long pipe nipple, and the other simulated fracture made by bonding six to nine mesh sand into a 1 inch diameter, 2 inch long pipe nipple using a minimum amount of an epoxy resin bonding agent to produce a typical porous test core. These test cores were then split with a chisel to form a crack or simulated fracture across a diameter of the face of the core. These fractured test cores were then inserted in the mud pump system as described in Example XVI to determine the characteristics of my wax-polymer spheroids in actual fractures similar to formation fractures. The end of the test cores where the chisel split the core was located abutting the mud pump circulation system flow. Both cores, with oil alone in the mud pump circulation system, demonstrated a very high rate of fluid flow. However, both cores bridged and essentially completely plugged when the fluid in the mud pump system comprised 20 pounds of the wax-polymer beads from Example I per barrel of 300 neutral oil. Thus, these simulated fractures plugged quickly at a system pressure of only 1,000 p.s.i.g. illustrating the excellent temporary plugging characteristics of my wax-polymer beads.

When the same test as above is run with ¼ inch naphthalene particles of about the same particle size as the wax-polymer beads, there is very poor plugging, and the naphthalene disappears rapidly because of the high solubility of the naphthalene in hydrocarbon formation fluids. Thus, as a temporary plugging agent, naphthalene is unsuccessful as it fails to satisfactorily plug the fractures and is too easily dissolved from the formation.

Repeating the same test with a 130°–134° petroleum base paraffin wax of substantially the same bead particle size as the wax-polymer beads used above, the wax is not strong enough to form a good ductile plug and thus extrudes through the test cores while dissolving so readily that softening destroys what little strength it has. Since the wax beads are crystalline in nature, the beads fracture and crack rather than deform so that the plugging characteristic is not satisfactory and there is substantial oil flow through the core.

*Example XVIII*

In a field test of the use of the hydrocarbon-polymer particles of this invention as temporary plugging agents, a wax-polymer blend (53% by weight of 130°/134° paraffin base petroleum wax; 33% by weight 143°/150° paraffin base petroleum wax; 14% by weight high molecular weight ethylene/vinylacetate copolymer, "Elvax 240") was used in the form of −4 to +100 mesh U.S. sieve spheroidal beads (made in Example I). The test was performed in a producing well with a production interval 13 feet thick (4,178 ft.–4,191 ft.). The casing of the producing zone was gun perforated with four holes per foot, each hole having a mean diameter of about ½ inch. The well production before my treatment was about 170 barrels per day gross of a 97% cut well effluent, i.e., 97% water and 3% hydrocarbon oil product. A conventional cement truck system was used to inject about thirty barrels of lease crude oil containing about 485 pounds of the wax-polymer beads (about 16 pounds per 42 gallon barrel) into the annulus between the casing and the tubing. The wax-polymer spheroids were then followed with an injection of a slug of 10 barrels of salt water. Then the well head (tubing) was closed, the annulus connected to the output of a salt water pump and about 49 barrels of salt water were injected in 4½ hours which was about 7 barrels more than the formation fluid volume left in the well cavity when closed off. Apparently the treatment successfully plugged all perforations rapidly since only the 7 barrels of lease crude oil and wax-polymer bead mixture could actually be forced into formation. The maximum injection pressure reached was about 2,000 p.s.i.g. and at the end of the injection period, bleed-off time was about 18 minutes to take the pressure from 2,000 p.s.i.g. to 600 p.s.i.g. There were no injection, pumping, or handling problems experienced during this wax-polymer injection operation.

The well was then placed on production, the initial production from the treated well immediately indicating some reduction in cut, i.e., 86 barrels per day gross of a 92% cut. Two days later, equilibrium production was established at about the same gross production rate (170 barrels per day) as prior to the treatment and illustrated no substantial change in cut. The effectiveness of the temporary selective plugging characteristics of the wax-polymer spheroidal beads was demonstrated in this test by the low fluid loss during injection and the improvement in cut upon putting the well into production. The satisfactory return of the well to its original production further demonstrated the ease of plug removal under field conditions and that no subsequent production problems result from the bottom hole injection of the hydrocarbon-polymer beads of this invention. The return within a few days to the original production rate and cut, i.e., only temporary plugging from the wax-polymer beads, was not unexpected because the softening point, about 130° F., of the wax-polymer spheroid beads was somewhat lower than the bottom hole temperature, about 140° F., of the well.

*Example XIX*

A formation fracturing test, using the same spheroidal hydrocarbon-polymer beads as used in Example XVIII (those manufactured in Example I) as temporary plugging and propping agents, was performed in a well penetrating a naturally fractured schist of a California oil field. The well selected for this test had been completed with slotted liners (3/16 inch slots) and was producing 33 barrels per day of a 99% cut well effluent (99% $H_2O$, 1% oil) prior to the fracturing operation. The objective of this fracturing operation was to establish communication with an oil zone which was believed to be existing in neighboring fractures. The test was carried out in three stages, using the hydrocarbon-polymer spheroidal beads to create multiple groups of fractures. A total of about 1,800 pounds of hydrocarbon-polymer spheroidal beads were used in this test to control the loss of fracturing oil during the three stage fracturing treatment. The fractures formed in the first and second stage of the treatment were plugged with the spheroidal pellets so that the fracturing oil would not be diverted during the subsequent stage. The hdyrocarbon-polymer beads were also introduced after the third stage to plug the last fracture temporarily.

Using conventional radio-active logging techniques, gamma radiation before and after fracturing was determined. A radio-active tracer was included with the hydrocarbon-polymer spheroidal beads used in each of the three stages to determine the existence and exact location of any multiple fractures created in the 275 foot zone (2,277 ft.–2,552 ft.) being fractured. The following treatment procedure was repeated in each of the three stages of the hydraulic fracturing operation of this test. The fracturing fluid was a lease crude which had been dehydrated and topped. First, at a rate of approximately 70 barrels per minute and a pressure of about 2,000 p.s.i.g., injection propping of existing fractures was conducted in the following sequence for a total of about 6½ minutes.

| | Gallons |
|---|---|
| Crude spearhead | 4,000 |
| Crude containing about 2.0 pounds per gal. of sand | 6,000 |
| Crude containing about 2.5 pounds per gal. of sand | 5,000 |
| Crude containing about 3.0 pounds per gal. of sand | 1,000 |
| Crude containing about 4.0 pounds per gal. of sand | 1,000 |
| Crude containing about 5.0 pounds per gal. of sand | 1,000 |
| Crude containing about 6.0 pounds per gal. of sand | 1,000 |

These injections were then followed for about 1½ minutes with a temporary plugging and propping slug of about 4,500 gallons of crude oil containing about 500 pounds each of 8–12 mesh U.S. sieve walnut shells and 12 to 40 mesh U.S. sieve wax-polymer spheroidal beads with a screw setting on the injection hopper equivalent to a sand rate of about 8 pounds per gallon. At this point in all three stages, the injection rate and pressure were reduced and approximately 15 barrels per minute of a tail-in mixture was injected for about 2 minutes. The tail-in mixture comprised about 100 pounds of fine (40 to 100 mesh) hydrocarbon-polymer spheroidal beads which were in a concentration of about 20 pounds of beads per barrel of fracturing fluid (lease crude). The injection rate was further slowed as the wax-polymer beads reached the top of the liner in order to seat the temporary plug in the fracture. This temporary plug sealing with the tail-in achieved almost complete flow stoppage and permitted rapid increase of flow rate and pressure for the subsequent fracturing stages.

This temporary plugging of the last group of fractures at the completion of the third stage permitted very rapid bailing of the said from the well bore with a spectacular saving in service charges. The sand bailing of the oil well after this fracture test required less than about 4 hours while previous conventional fracture treatments in the area, without my wax-polymer bead plugging agent, have always required from 4 to 5 days for sand bailing of the well bore. Furthermore, the gamma ray logging of a well after fracture cannot be completed until the sand bailing has been finished, which is usually several days after fracturing. In this fracturing operation, the gamma ray logging was completed the same day that the fracture was made thus providing a much truer picture of the fracturing operation results. The radio active logging during this test showed the creation of at least three distinct multiple fractures of considerable size. Thus, the well was gamma ray logged initially prior to fracturing, fractured in three stages, bailed, and the gamma ray logging after fracturing completed all in the same day.

The well was immediately put back on production at the conclusion of the final logging with a rate of 187 bbl./day of 2% cut the first day. All of the lease crude oil carrier or fracturing fluid used in this fracture treatment was subsequently recovered from the well. The well had stabilized after twenty days with an average production of about 20 barrels of oil per day net (205 bbl./day gross of an 89% cut) as compared with an original production of about ⅓ barrel of oil per day net (33 bbl./day gross of a 99% cut). This test demonstrated that the hydrocarbon-polymer spheroidal beads of this invention possess particularly unique and useful characteristics in fracturing operations as a temporary propping and plugging agent in the creation of multiple fractures in a thick producing zone which has been completed with slotted liners.

When substantially the same fracturing technique as above-described is performed with the intent to utilize the selective plugging feature of my hydrocarbon-polymer blends, an injection of large, separate quantities (500 to 1,00 pounds) of the spheroids is carried out ahead of the sands. Thus, the "plugging" spheroids are located deep in the formation for optimum blocking of water-producing zones. This selective plugging accomplishes spectacular reductions in formation water in the produced well effluents.

The hydrocarbon-polymer blends of this invention can have many other applications in industry, besides treating oil wells and formations, including use as adhesives, lubricants, solid fuels, adhesives, drugs, and igniters, e.g., hydrocarbon-polymer particles can be used for igniting charcoal for outdoor cooking and the like. Further, the spheroidal hydrocarbon-polymer beads of this invention, because of the advantageous properties of packaging, convenient handling, and stable storage, particularly when coated with a solids parting agent, are readily adapted to commercial usage. Also, the hydrocarbon-polymer blends made from light liquid hydrocarbons have a potential commercial use as a latex-type of emulsion for reducing fluid loss in many applications in oil well and oil formation treating.

In the foregoing specification and in the appended claims, the blend material used in the process of this invention, and the bead material made by my novel manufacturing technique, is described as a hydrocarbon-polymer mixture comprising certain hydrocarbon components and certain polymer components. It is to be understood, however, that the term hydrocarbon is meant to include hydrocarbons containing small, normally incident amounts of nitrogen, sulfur, oxygen, halides, and other inorganic substituent components. Further, throughout the specification and claims, where the term softening point or temperature is used it is to be understood that this is the glass transition point or second order transition (solid to liquid) temperature, and where the term melting point or temperature is used it is intended that this is the crystalline melting point or first order transition temperature.

Various other changes and modifications of this invention are apparent from the description of this invention and further modifications will be obvious to those skilled in the art. Such modifications and changes are intended to be included within the scope of this invention as defined by the following claims:

I claim:

1. A process for treating subterranean formations penetrated by a well comprising:
   injecting into said well elevated pressure a treating fluid comprising a pumpable carrier liquid having suspended therein oil-soluble, water-insoluble solid particles, said particles comprising a homogeneous mixture of organic polymer and hydrocarbon.

2. A process as defined by claim 1 concentration of said solid particles is between about 15 pounds and about 25 pounds per 42 gallon barrel of said carrier liquid.

3. A process as defined by claim 1 wherein said solid particles are spheroidal.

4. A process as defined by claim 1 wherein said solid particles are coated with a finely divided solid.

5. A process as defined by claim 1 wherein said hydrocarbon is a paraffin wax.

6. A process as defined by claim 1 wherein said polymer is selected from the group consisting of copolymer ethylene and vinyl acetate and copolymer ethylene and ethyl acrylate.

7. A process for permanently sealing a water flow channel in a formation penetrated by a well comprising:
   injecting into said well a sufficient amount of solid particulate sealant for a period and at a pressure sufficient to seal said flow channel, each particle of said particulate sealant comprising a homogeneous mixture of non-gaseous hydrocarbon and organic polymer, and said particulate sealant being substantially insoluble in water at the formation temperature and having a melting point above the formation temperature.

8. A process for temporarily plugging a hydrocarbon flow channel in a formation penetrated by a well comprising:
   injecting solid plugging particles suspended in a pumpable carrier liquid into said well, each of said plugging particles comprising a homogeneous mixture of non-gaseous hydrocarbon and organic polymer, said plugging particles being slowly soluble in hydrocarbon fluids at the formation temperature, and said carrier liquid being at a temperature below the melting temperature of said particles at the time of initial contact with the formation.

9. A process according to claim 8 wherein said plugging particles comprise a homogeneous blend of a paraffin hydrocarbon and an addition polymer.

10. A process according to claim 8 wherein said plugging particles are spheroidal in shape and have a gradation in particle size in which about half of the spheroidal particles are in the range of about 4 mesh to about 10 mesh U.S. sieve and the remaining portion of the particles are in a range smaller than about 10 mesh U.S. sieve.

11. A process for treating an oil producing formation penetrated by a well comprising the steps of:
   injecting into said well a pumpable carrier fluid carrying solid sealant particles, said sealant particles having a particle size which will bridge in the openings in said oil bearing formation;
   forcing said pumpable carrier fluid containing said sealant particles against the exposed surface of said formation so as to plug openings in said oil bearing formation with sealant particles; and
   producing oil from said treated well, each of said sealant particles comprising a homogeneous mixture of non-gaseous hydrocarbon and organic polymer, and said sealant particles being substantially insoluble in formation water and being slowly soluble in the formation hydrocarbons at the formation temperature.

12. A process for increasing the viscosity of a hydrocarbon liquid in situ in a subterranean formation penetrated by a well comprising:
   injecting into said well an oil-soluble, solid particulate viscosity increasing additive, each additive particle comprising a homogeneous mixture of non-gaseous hydrocarbon and organic polymer;
   permitting said particulate viscosity increasing additive to dissolve in said hydrocarbon liquid in said formation thereby increasing the viscosity of said hydrocarbon liquid.

13. In a method for increasing the permeability to fluids of a subsurface earth formation having at least one fracture extending from the wall of a well bore into the formation, the improvement comprising:
   injecting into said fracture a fluid suspension of a mixture of inert solid permanent propping particles and generally spheroidal solid temporary propping particles, each temporary solid particle comprising a homogeneous mixture of non-gaseous hydrocarbon and organic polymer, said temporary and permanent propping particles having particle sizes in the range of about 4 to about 40 mesh U.S. sieve, said temporary propping particles being soluble in hydrocarbon fluid at the formation temperature.

14. In a method for increasing the permeability to fluids of a subsurface earth formation having at least one fracture extending from the wall of a well bore into the formation, the improvement comprising:
   injecting into said fracture a fluid suspension of sand and solid spheroidal beads, each of said beads comprising a homogeneous mixture of paraffin wax and organic addition polymer, said sand and said beads having particle sizes between about 8 mesh and about 20 mesh U.S. sieve.

15. A method of performing at least one of the operations of fracturing and bridging a subterranean hydrocarbon bearing formation surrounding a well bore which comprises:
   injecting a fracturing fluid into said formation under an elevated formation fracturing pressure, said fracturing fluid including solid sealing particles, each of said solid sealing particles comprising a homogeneous blend of non-gaseous hydrocarbon with organic polymer, said sealing particles having the capacity at elevated pressures to temporarily block the flow of fracturing fluid into formation fissures and being soluble in hydrocarbon at the formation temperature.

16. A method according to claim 15 wherein said sealing particles are substantially insoluble in water at the formation temperature and have a melting point above the formation temperature.

17. A method of performing at least one of the operations of fracturing and bridging a hydrocarbon bearing formation surrounding a well which comprises:
   introducing a fracturing fluid to said formation under an elevated fracturing pressure, said fracturing fluid including a carrier liquid, solid insoluble permanent propping particles, and solid temporary propping particles, each of said solid temporary propping particles comprising a homogeneous mixture of non-gaseous hydrocarbon and organic polymer, said fracturing fluid plugging said formation and the extended fractures formed therein, said temporary propping particles being soluble in the crude oil in said formation after a period of time, and said solid insoluble permanent propping particles having the ability to permanently prop fissures formed in said fracturing operation thus allowing the passage of crude oil through the interstitial spaces between said permanent propping particles.

18. In the process of fracturing a subterranean formation traversed by a well wherein a fracturing fluid is forced into the well bore under pressure, the method of temporarily sealing said formation against loss of appreciable amounts of said fracturing fluid comprising:
   dispersing in said fracturing fluid a sufficient amount of solid plugging agent particles, each of said particles comprising a homogeneous mixture of non-gaseous hydrocarbon and organic polymer, said particles being substantially water insoluble and being soluble in the formation hydrocarbon oil at the formation temperature.

19. A method for producing fractures in a formation penetrated by a well, comprising:
   injecting a first portion of a first fracturing fluid into said formation at a pressure sufficient to produce a first fracture in said formation;
   injecting into said well a sufficient amount of a second fracturing fluid comprising a carrier liquid and solid particulate propping agents;
   injecting into said well a third fracturing fluid comprising a carrier liquid and a solid particulate sealant, each particle of said particulate sealant comprising hydrocarbon and organic polymer to temporarily seal said first fracture.

20. A method according to claim 19 including the additional step of injecting a portion of a fracturing fluid into said formation at a pressure sufficient to produce a second fracture in said formation.

21. A method according to claim 20 wherein said second fracture is sealed by injection of a second portion of said third fracturing fluid.

22. A method according to claim 19 wherein, after temporarily sealing said first fracture, said well is bailed to remove an accumulation of an excess of said propping particles.

23. A method according to claim 19 wherein said first fracturing fluid comprises a spearhead of oil.

24. A method according to claim 19 wherein said first fracturing fluid comprises a carrier liquid and a second solid particulate sealant, each of said particles of said second particulate sealant comprising non-gaseous hydrocarbon and organic polymer and said second solid sealant particles being soluble after a period of time in hydrocarbon fluid.

25. A method according to claim 19 wherein said first fracturing fluid comprises a carrier liquid and a solid particulate viscosity increasing additive, each of said solid viscosity increasing additive particles comprising a blend of hydrocarbon and organic polymer and said solid additive particles being readily soluble in said fracturing fluid at the formation fracturing location thereby increasing the first fracturing fluid viscosity at the fracturing location.

26. A method according to claim 19 wherein said second fracturing fluid comprises a carrier liquid, solid permanent propping agent particles, and solid temporary propping agent particles, each of said solid temporary propping agent particles comprising a blend of non-gaseous hydrocarbon and organic polymer, said temporary propping agent particles being soluble in hydrocarbons at the formation temperature.

27. A method for producing fractures in a formation penetrated by a well comprising:

(1) injecting a preliminary spearhead of crude oil into said formation at a pressure and a rate sufficient to produce a first fracture in said formation;
(2) injecting into said well at a pressure and a rate sufficient to produce a first fracture in said formation a first propping fluid comprising crude oil and sand;
(3) injecting into said well at a pressure and a rate sufficient to produce a first fracture in said formation a second propping fluid comprising a crude oil suspension of walnut shell particles and spheroidal temporary propping beads, each bead comprising paraffin wax and a copolymer of ethylene and vinyl acetate; and
(4) injecting into said well at a lower pressure and a lower rate than the previous injections a fracture sealing fluid comprising a crude oil suspension of spheroidal sealing beads, each bead comprising paraffin wax and a copolymer of ethylene and vinyl acetate.

28. A method as defined in claim 27 wherein steps (1), (2), (3) and (4) are repeated in sequence at least once to produce at least a second fracture in said formation.

29. A method of fracturing a permeable formation at a selected elevation in a well comprising:
depositing in said selected elevation in said well a solid temporary plugging agent comprising a slurry of plugging particles, each plugging particle comprising a homogeneous mixture of non-gaseous hydrocarbon and organic polymer, said plugging particles being suspended in a carrier liquid;
injecting a fracturing fluid on top of and behind said plugging particles at said selected elevation so as to effect a temporary seal in the fissures and on the face of said formation at said selected elevation;
increasing the pressure on said fracturing fluid to a value greater than the formation break down pressure thereby injecting said fracturing liquid into said formation by fracturing at said selected elevation.

30. A composition for propping a fracture in a subsurface earth formation comprising:
a pumpable fluid suspension comprising substantially inert solid particles of a permanent propping agent and particles of a temporary propping agent, each of said temporary propping agent particles comprising a homogeneous mixture of non-gaseous hydrocarbon and organic polymer.

31. A composition according to claim 30 wherein said temporary propping agent particles comprise not more than about half of the sum of said permanent propping agent particles and said temporary propping agent particles, and wherein said permanent propping agent particles and said temporary propping agent particles are spheroidal.

32. A composition for propping a fracture in a subsurface earth formation comprising a crude oil suspension of walnut shell particles and solid spheroidal beads, each of said beads comprising a homogeneous mixture of hydrocarbon wax and organic addition polymer, said beads being characterized by having a particle size between about 8 mesh and about 20 mesh U.S. sieve.

33. In the drilling of a borehole into a subterranean formation by the method wherein a drilling fluid is circulated to the bottom of the borehole and returned to the surface and wherein loss of drilling fluid to the permeable zones of said formation is reduced by the addition of lost circulation additive to the drilling fluid, the improvement which comprises employing solid particles of a homogeneous mixture of organic polymer and hydrocarbon as lost circulation additive.

34. A composition which comprises a suspension of discrete solid particles of a homogeneous mixture of nongaseous hydrocarbon and an addition polymer in a pumpable carrier liquid, said addition polymer being selected from the group consisting of copolymer ethylene and vinyl acetate and copolymer ethylene and ethyl acrylate.

35. A composition according to claim 34 wherein said carrier liquid is a petroleum oil.

36. A composition according to claim 34 wherein said carrier liquid is water.

37. A composition according to claim 34 wherein said carrier liquid is thickened water.

38. A composition according to claim 34 wherein said solid particles are present in a concentration of between about 15 and about 25 pounds of solids per 42 gallon barrel of said carrier liquid.

39. A composition according to claim 34 wherein said solid particles are within a size range of between about 4 mesh to about 100 mesh U.S. sieve.

40. A composition according to claim 34 wherein said solid particles have a substantially spheroidal shape.

41. A composition according to claim 34 in which said nongaseous hydrocarbon comprises liquid paraffinic oil containing between 4 and 17 carbon atoms.

42. A composition according to claim 34 wherein said nongaseous hydrocarbon is a solid paraffinic wax containing at least 18 carbon atoms.

43. A composition which comprises a suspension of discrete solid particles in a petroleum oil, each of said solid particles comprising a homogeneous mixture of nongaseous hydrocarbon and organic polymer, and said particles having a size distribution in which there is a particle size gradation from about 4 mesh to about 100 mesh U.S. sieve.

44. A composition comprising a carrier liquid having dispersed therein between about 15 and about 25 pounds of oil-soluble, water-insoluble solid particles per 42 gallon barrel of said carrier liquid, said solid particles comprising a homogeneous mixture of nongaseous hydrocarbon and organic polymer and said solid particles having a particle size gradation from about 4 mesh to about 100 mesh U.S. sieve.

45. An oil-soluble, water-insoluble solid particulate composition comprising discrete solid particles of a homogeneous mixture of nongaseous hydrocarbon and organic polymer, said particles having a substantially spheroidal shape and a size within the range of from about 4 mesh to about 100 mesh U.S. sieve, and said organic polymer being selected from the group consisting of copolymer ethylene and vinyl acetate and copolymer ethylene and ethyl acrylate.

References Cited by the Examiner
UNITED STATES PATENTS

| | | | |
|---|---|---|---|
| 2,834,746 | 5/1958 | Salyer et al. | 260—33.6 |
| 2,846,011 | 8/1958 | Miller | 166—42.1 X |
| 3,008,946 | 11/1961 | Rhodes et al. | 260—33.6 |
| 3,021,901 | 2/1962 | Earlougher | 166—42.1 |
| 3,026,938 | 3/1962 | Huitt et al. | 166—42.1 |
| 3,043,793 | 7/1962 | Mertes et al. | 260—33.6 |
| 3,081,276 | 3/1963 | Snyder et al. | 260—33.6 X |
| 3,149,673 | 9/1964 | Pennington | 166—42.1 |
| 3,171,825 | 3/1965 | Mark | 260—28.5 |
| 3,173,484 | 3/1965 | Huitt et al. | 166—42.1 X |
| 3,181,612 | 5/1965 | West et al. | 166—42.1 X |
| 3,201,364 | 8/1965 | Salyer | 260—33.6 |
| 3,227,668 | 1/1966 | Ackermann | 260—28 |

CHARLES E. O'CONNELL, *Primary Examiner.*

S. J. NOVOSAD, *Assistant Examiner.*

UNITED STATES PATENT OFFICE

CERTIFICATE OF CORRECTION

Patent No. 3,316,965                                                     May 2, 1967

David J. Watanabe

It is hereby certified that error appears in the above numbered patent requiring correction and that the said Letters Patent should read as corrected below.

Column 28, line 26, after "well" insert -- under --; line 31, after "claim 1" insert -- wherein the --.

Signed and sealed this 21st day of November 1967.

(SEAL)
Attest:

Edward M. Fletcher, Jr.                                       EDWARD J. BRENNER

Attesting Officer                                                   Commissioner of Patents

UNITED STATES PATENT OFFICE
CERTIFICATE OF CORRECTION

Patent No. 3,316,965                                      May 2, 1967

David J. Watanabe

It is hereby certified that error appears in the above numbered patent requiring correction and that the said Letters Patent should read as corrected below.

Column 28, line 26, after "well" insert -- under --; line 31, after "claim 1" insert -- wherein the --.

Signed and sealed this 21st day of November 1967.

(SEAL)
Attest:

Edward M. Fletcher, Jr.                                  EDWARD J. BRENNER
Attesting Officer                                             Commissioner of Patents